United States Patent
Norimoto

(10) Patent No.: US 9,660,285 B2
(45) Date of Patent: May 23, 2017

(54) FUEL CELL AND METHOD FOR MANUFACTURING THE SAME

(75) Inventor: Michito Norimoto, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 873 days.

(21) Appl. No.: 13/993,397

(22) PCT Filed: Dec. 24, 2010

(86) PCT No.: PCT/JP2010/073437
§ 371 (c)(1),
(2), (4) Date: Jun. 12, 2013

(87) PCT Pub. No.: WO2012/086082
PCT Pub. Date: Jun. 28, 2012

(65) Prior Publication Data
US 2013/0266887 A1  Oct. 10, 2013

(51) Int. Cl.
*H01M 8/12* (2016.01)
*H01M 8/1004* (2016.01)
*H01M 4/86* (2006.01)
*H01M 8/0234* (2016.01)

(52) U.S. Cl.
CPC ....... *H01M 8/1004* (2013.01); *H01M 4/8668* (2013.01); *H01M 8/0234* (2013.01); *Y02P 70/56* (2015.11)

(58) Field of Classification Search
CPC ....... H01M 2008/1095; H01M 8/1004; H01M 8/241; H01M 2300/0082; H01M 4/8807; H01M 8/0234; H01M 4/8668; Y02P 70/56
See application file for complete search history.

(56) References Cited

U.S. PATENT DOCUMENTS

| | | | | |
|---|---|---|---|---|
| 6,001,500 A | * | 12/1999 | Bass | ............... H01M 4/926 429/484 |
| 2003/0194557 A1 | * | 10/2003 | Wilde | ............... D21H 13/50 428/408 |

(Continued)

FOREIGN PATENT DOCUMENTS

| CN | 1650452 | 8/2005 |
|---|---|---|
| CN | 1957496 | 5/2007 |

(Continued)

*Primary Examiner* — Ula C Ruddock
*Assistant Examiner* — Lisa S Park
(74) *Attorney, Agent, or Firm* — Finnegan, Henderson, Farabow, Garrett & Dunner, LLP

(57) ABSTRACT

Disclosed are: a fuel cell which is provided with a membrane electrode assembly (50), an anode-side gas diffusion layer (52) and a cathode-side gas diffusion layer (54); and a method for manufacturing the cell. The degree of processing for suppressing protrusion of carbon fibers in the anode-side gas diffusion layer (52) and the degree of processing for suppressing protrusion of carbon fibers in the cathode-side gas diffusion layer (54) are set to be different from each other. Specifically, protrusion from the anode-side gas diffusion layer (52) is sufficiently suppressed, thereby being prevented from damaging the membrane electrode assembly (50). Meanwhile, the degree of suppression processing of the cathode-side gas diffusion layer (54) is set low, thereby securing drainage of generated water.

6 Claims, 6 Drawing Sheets

(56) References Cited

U.S. PATENT DOCUMENTS

| | | | |
|---|---|---|---|
| 2003/0211376 A1* | 11/2003 | Hatoh | H01M 4/8605 |
| | | | 429/431 |
| 2004/0076753 A1* | 4/2004 | Sousa | B05D 1/18 |
| | | | 427/322 |
| 2005/0142430 A1 | 6/2005 | Yoshida et al. | |
| 2007/0202388 A1* | 8/2007 | Koehler | H01M 8/04119 |
| | | | 429/423 |

FOREIGN PATENT DOCUMENTS

| | | |
|---|---|---|
| JP | 2004-111341 | 4/2004 |
| JP | 2007-527103 | 9/2007 |
| JP | 2008-198526 | 8/2008 |
| WO | WO 03/081700 A1 | 10/2003 |

* cited by examiner

FUEL CELL AND METHOD FOR MANUFACTURING THE SAME

TECHNICAL FIELD

The present invention relates to a fuel cell and a method for manufacturing the same. More specifically, the present invention relates to a configuration of gas diffusion layers.

BACKGROUND ART

A single high polymer fuel cell is a fuel cell stack that includes a plurality of cells being mutually stacked to output a higher output. Each cell (smallest unit) includes a membrane electrode assembly (MEA), which includes an electrolyte film made of a proton exchange membrane and sandwiched between two electrodes, i.e., a fuel electrode and an air electrode. The cell, unit further includes two separators that sandwich the membrane electrode assembly.

The single high polymer fuel cell can generate electric power, as is conventionally known and is simply described below. A hydrogen containing gas, serving as fuel gas, is supplied to the fuel electrode (i.e., an anode-side electrode). An oxygen containing gas or air, serving as oxidizing agent gas, is supplied to the air electrode (i.e., a cathode-side electrode). The hydrogen containing gas, when it is supplied via a fuel gas passage to the anode-side electrode, is decomposed into electrons and hydrogen ions by a function of a catalyst layer of the electrode. Electrons move to the cathode-side electrode via an external circuit. On the other hand, hydrogen ions pass through the electrolyte film and reach the cathode electrode, where the hydrogen ions join with the oxygen and the electrons having reached via the external circuit, thereby generating reaction water. The heat generated by a binding reaction between hydrogen, oxygen, and electrons is absorbed by cooling water. Further, water generated on the cathode electrode (hereinafter, referred to as "generated water") is drained from the cathode side.

The anode electrode and the cathode electrode of the above-described fuel cell are constituted by catalyst layers, respectively. The catalyst layer includes a plurality of gas diffusion layers laminated to diffuse the hydrogen containing gas or the oxidizing agent gas. However, if the drainage of the generated water resulting from the above-described reaction on the cathode side is not smooth, a blocking phenomenon ("flooding phenomenon") may occur in the cathode electrode. Hence, the gas diffusion layer is configured to include a water repellent layer in addition to a layer that contains carbon fibers. The water repellent layer can expedite the drainage of generated water.

However, in a state where at least a part of carbon fibers in the gas diffusion layer protrudes from the layer surface, if the gas diffusion layer is laminated on the membrane electrode assembly, the membrane electrode assembly may be damaged by a protruded carbon fiber. Accordingly, it is necessary to prevent the membrane electrode assembly from being damaged by protrusion of carbon fibers.

A method discussed in the following Patent Literature 1 includes placing a gas diffusion layer substrate including fibers on a roller, bending the substrate along the roller, and integrating the substrate with a membrane electrode assembly after removing the protruded part of the fibers in a state where the protruded fibers are raised.

Prior Art Reference
Patent Literature
Patent Literature 1: JP 2008-198526 A

SUMMARY OF THE INVENTION

Problem to be Solved by the Invention

FIG. 11 schematically illustrates a state of a membrane electrode assembly damaged by protrusion of carbon fibers, A fuel cell unit illustrated in FIG. 11 includes a membrane electrode assembly (MEA) 50 that is formed by sandwiching an electrolyte film with a pair of catalyst layers, each being functionally operable as an electrode. The fuel cell unit further includes two gas diffusion layers 52 and 54, which are provided on opposite surfaces of the membrane electrode assembly 50. Each of the gas diffusion layers 52 and 5 4 includes a layer of carbon fibers 24 and a water repellent layer 22, which are laminated together. Further, the fuel cell unit includes two separators 62 and 64 that are disposed and formed in such a way as to sandwich the membrane electrode assembly 50 and the gas diffusion layers 52 and 54. The layer of the carbon fibers 24 is an assembly of carbon fibers 24. The assembly of carbon fibers 24 is united with the water repellent layer 22 to form the gas diffusion layers 52 and 54. When a hydrogen containing gas is supplied to the gas diffusion layer 52, the gas diffusion layer 52 is functionally operable as an anode-side gas diffusion layer 52. When an oxidizing agent gas (e.g., air) is supplied to the gas diffusion layer 54, the gas diffusion layer 54 is functionally operable as a cathode-side gas diffusion layer 54.

In an ordinary state of the fuel cell unit, even when the carbon fibers 24 protrude toward the water repellent layer 22 from the layer of the carbon fibers 24, protruded portions of the carbon fibers 24 remain in the water repellent layer 22, However, in a case where the fuel cell includes a plurality of cells laminated together in such a way as to form a stack structure, a significant pressure is applied to the gas diffusion layers 52 and 54 in the thickness direction. If a protruded part 60 of the carbon fiber 24 protrudes from, the water repellent layer 22, there is the possibility of damaging the membrane electrode assembly 50.

In this case, if the membrane electrode assembly 50 has a sufficient thickness, the protruded part of the carbon fibers 24 may not pierce through the membrane electrode assembly 50. The damage of the membrane electrode assembly 50 may not be so serious that it has a significant influence on battery characteristics. However, in a case where the membrane electrode assembly 50 (more specifically, the electrolyte film) is formed to be thin enough to enable the fuel cell to generate a higher output, there is a higher possibility of damaging the membrane electrode assembly 50. For example, a pierced electrolyte film induces an increase in gas cross leakage or short circuit current.

The present invention is intended to provide a fuel cell that can generate a higher output and can prevent carbon fibers protruding from a plane surface from damaging a membrane electrode assembly. Further, the present invention is intended to provide a method for manufacturing the fuel cell.

Means for Solving Problem

The present invention provides a fuel cell that includes a membrane electrode assembly including catalyst layers provided on both surfaces of an electrolyte film; an anode-side gas diffusion layer provided on an anode side of the membrane electrode assembly; and a cathode-side gas diffusion layer provided on a cathode side of the membrane electrode assembly, wherein the anode-side gas diffusion layer and the cathode-side gas diffusion layer include carbon fibers, and a degree of protrusion of the carbon fibers from a plane surface of the anode-side gas diffusion layer and a degree of protrusion of the carbon fibers from a plane surface of the cathode-side gas diffusion layer are mutually different, and the protrusion of carbon fibers from the plane surface of the anode-side gas diffusion layer is suppressed compared to that of the cathode-side gas diffusion layer.

According to an embodiment of the present invention, the protrusion of carbon, fibers from the anode-side gas diffusion layer is suppressed, and protrusion of carbon fibers from the cathode-side gas diffusion layer is not suppressed.

According to another embodiment of the present invention, protrusion of carbon fibers from the anode-side gas diffusion layer is suppressed using a first method, and protrusion of carbon fibers from the cathode-side gas diffusion layer is suppressed using a second method that is different from the first method.

According to another embodiment of the present invention, a snort circuit current value of the anode-side gas diffusion layer is set to be smaller than a short circuit, current value of the cathode-side gas diffusion layer.

According to another embodiment of the present invention, at least the short circuit current value of the anode-side gas diffusion layer is equal to or less than a predetermined threshold value.

According to another embodiment of the present invention, a binder resin content of the anode-side gas diffusion layer is set to be greater than a binder resin content of the cathode-side gas diffusion layer.

Further, the present invention provides a method for manufacturing a fuel cell, including a process for suppressing protrusion of carbon fibers from a plane surface of an anode-side gas diffusion layer, a process for suppressing protrusion of carbon fibers from a plane surface of a cathode-side gas diffusion layer to be relatively low compared to that in the anode-side gas diffusion layer, and a process for integrating the anode-side gas diffusion layer and the cathode-side gas diffusion layer with a membrane electrode assembly by using a hot pressing process.

According to an embodiment of the present invention, the cathode-side gas diffusion layer is not subjected to the processing for suppressing the protrusion of carbon fibers.

According to another embodiment of the present invention, the protrusion of carbon fibers from the anode-side gas diffusion layer is suppressed using a first method, and the protrusion of carbon fibers from the cathode-side gas diffusion layer is suppressed using a second method that is different from the first method.

According to another embodiment of the present invention, a binder resin content of the anode-side gas diffusion layer is set to be greater than a binder resin content of the cathode-side gas diffusion layer.

According to another embodiment of the present invention, the process for suppressing the protrusion of carbon fibers in the anode-side gas diffusion layer is a cold press.

According to another embodiment of the present invention, there is provided a process for filling up a hole of the membrane electrode assembly generated by the protrusion of carbon fibers from the cathode-side gas diffusion layer with an electrolyte film component that constitutes the membrane electrode assembly.

Effects of the Invention

The present invention can provide a fuel cell capable of generating a higher output and can prevent the protrusion of carbon fibers from the gas diffusion layer from damaging the membrane electrode assembly.

MODE FOR CARRYING OUT THE INVENTION

Figure 1:
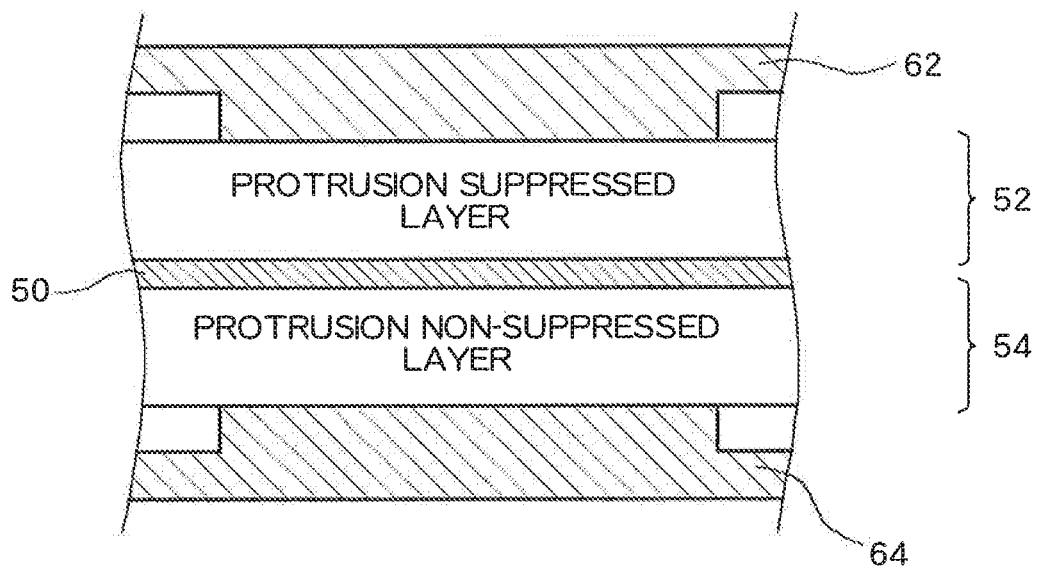
FIG. 1 illustrates a fuel cell according to a first embodiment.

Hereinafter, embodiments of the present invention are described with reference to attached drawings. Each of the following embodiments is a mere example. The present invention is not limited to the following embodiments.

1. Basic configuration and basic principle

A fuel cell unit according to the present embodiment has the following basic configuration. More specifically, the fuel cell unit includes a membrane electrode assembly (MEA) that is formed by sandwiching an electrolyte film with a pair of catalyst layers, each being functionally operable as an electrode. The fuel cell unit further includes two gas diffusion layers, which are provided on opposite surfaces of the membrane electrode assembly. Each gas diffusion layer includes a layer of carbon fibers and a water repellent layer, which are laminated together. Further, the fuel cell unit includes two separators that are disposed and formed in such a way as to sandwich the membrane electrode assembly and the gas diffusion layers. The layer of the carbon fibers is an assembly of carbon fibers. The assembly of carbon fibers is united with the water repellent layer to form the gas diffusion layers. When a hydrogen containing gas is supplied to the gas diffusion layer, the gas diffusion layer is functionally operable as an anode-side gas diffusion layer. When an oxidizing agent gas (e.g., air) is supplied to the gas diffusion layer, the gas diffusion layer is functionally operable as a cathode-side gas diffusion layer.

The hydrogen containing gas, when it is supplied via a fuel gas passage to the anode-side electrode, is decomposed into electrons and hydrogen ions by a function of a catalyst layer of the electrode. Electrons move to the cathode-side electrode via an external circuit. On the other hand, hydrogen ions pass through the electrolyte film and reach the cathode electrode, where the hydrogen ions join with the oxygen and the electrons having reached via the external circuit, thereby generating reaction water. The water generated on the cathode electrode is drained from the cathode side.

In the above-described configuration, if at least a part of carbon fibers protrudes from the surface of the gas diffusion layer, a distal end (i.e., fluff) of a carbon fiber protruding from the layer surface may damage the membrane electrode assembly when the gas diffusion layer is laminated on the membrane electrode assembly. In particular, there is a higher possibility of damaging the membrane electrode assembly if the membrane electrode assembly (more specifically, the electrolyte film) is formed to be thin enough to have a lower hydrogen ion (proton) resistance to enable the fuel cell unit to generate a higher output. For example, a pierced electrolyte film induces an increase in gas cross leakage or snort circuit current. Hence, the present embodiment includes applying predetermined processing to the gas diffusion layer to suppress protrusion of carbon fibers and prevent the gas diffusion layer from damaging the membrane electrode assembly when the gas diffusion layer is laminated on the membrane electrode assembly.

Meanwhile, the processing for suppressing the protrusion of carbon fibers generally deteriorates water repellency (or drainage or water permeability) that the gas diffusion layer inherently possesses. For example, if a binder resin is used to unite or bond the layer of carbon fibers with the water repellent layer together, the carbon fibers can be firmly united together when the ratio of the binder resin is sufficiently high. Thus, suppressing the protrusion of carbon fibers is feasible. However, if the ratio of the binder resin is increased, the water repellency or drainage deteriorates correspondingly because the region of the carbon fibers and holes in the water repellent layer are filled with the binder resin. In particular, the cathode-side gas diffusion layer has sufficient water repellency to drain generated water, as described above. Therefore, if the processing for suppressing the protrusion of carbon fibers is applied as described above, it will deteriorate the water repellency of the cathode-side gas diffusion layer. The output decreases due to the flooding phenomenon that occurs in the cathode side. Further, the generated water inversely diffuses from the cathode side to the anode side and maintains the anode side in a wet state. Accordingly, improving the output becomes difficult.

Hence, in the present embodiment, the processing for suppressing the protrusion of carbon fibers is applied to the anode-side gas diffusion layer, thereby preventing the protrusion of carbon fibers from damaging the membrane electrode assembly. On the other hand, the processing for suppressing the protrusion of carbon fibers is not applied to the cathode-side gas diffusion layer, or the degree of the processing is limited even when the processing is applied, considering the water repellency or to expedite the drainage. When the cathode-side gas diffusion layer is not subjected to the processing for suppressing the protrusion of carbon fibers, there is the possibility that a protruded carbon fiber will pierce the membrane electrode assembly in the process of laminating the cathode-side gas diffusion layer on the membrane electrode assembly. However, the anode-side gas diffusion layer does not pierce the membrane electrode assembly because the anode-side gas diffusion layer is subjected to the processing for suppressing the protrusion of carbon fibers. The applicant of the present invention has confirmed that there is the higher possibility of increasing the gas cross leakage or the short circuit current due to a through hole formed across the membrane electrode assembly when both the carbon fibers in the anode-side gas diffusion layer and the carbon fibers in the cathode-side gas diffusion layer protrude toward the membrane electrode assembly and pierce the membrane electrode assembly from both surfaces thereof. More specifically, the applicant of the present invention has confirmed that applying the carbon fiber protrusion suppression processing to at least one of the anode-side gas diffusion layer and the cathode-side gas diffusion layer is useful to prevent the membrane electrode assembly from being damaged.

Thus, the present embodiment intends to prevent the membrane electrode assembly from being damaged and secure the drainage of generated water on the cathode side sufficiently to realize a higher output, by applying the carbon fiber protrusion suppression processing to the anode-side gas diffusion layer and not applying the carbon fiber protrusion suppression processing to the cathode-side gas diffusion layer, or limiting the degree of the processing even when the processing is applied, based on the above-described principle.

Limiting the degree of the carbon fiber protrusion suppression processing even when the processing is applied to the cathode-side gas diffusion layer can be expressed differently in the following manner. The degree of the carbon fiber protrusion suppression processing to be applied to the cathode-side gas diffusion layer is set to be relatively low compared to the degree of the carbon fiber protrusion suppression processing to be applied to the anode-side gas diffusion layer. More specifically, when the same type of processing is applied to both the anode-side and cathode-side gas diffusion layers, the degree of the processing is set to be relatively low on the cathode side or the processing time is set to be short on the cathode side. Further, when the processing to be applied to the anode-side gas diffusion layer is different from the processing to be applied to the cathode-side gas diffusion layer, the effect of suppressing the protrusion of carbon fibers is set to be lower in the processing applied to the cathode-side gas diffusion layer.

In a conventional fuel cell unit, the anode-side gas diffusion layer and the cathode-side gas diffusion layer are the same or made of substantially the same material. However, in the present embodiment, the anode side and the cathode side of the gas diffusion layer are different from each other, or asymmetric, in degree of the protrusion of carbon fibers.

The present embodiment is described in detail below.

2. First Embodiment

FIG. 1 is a cross-sectional view illustrating a fuel cell unit according to the present embodiment. The fuel cell unit illustrated in FIG. 1 includes a membrane electrode assembly (MEA) 50 that is formed by sandwiching an electrolyte film with a pair of catalyst layers each being functionally operable as an electrode. The fuel cell unit further includes two gas diffusion layers 52 and 54, which are provided on opposite surfaces of the membrane electrode assembly. Each of the gas diffusion layers 52 and 54 includes a layer of carbon fibers 24 and a water repellent layer 22, which are laminated together. Further, the fuel cell unit includes two separators 62 and 64 that are disposed and formed in such a way as to sandwich the membrane electrode assembly 50 and the gas diffusion layers 52 and 54. When a hydrogen containing gas is supplied to the gas diffusion layer 52, the gas diffusion layer 52 is functionally operable as the anode-side gas diffusion, layer 52. When an oxidizing agent gas (e.g., air) is supplied to the gas diffusion layer 54, the gas diffusion layer 54 is functionally operable as the cathode-side gas diffusion layer 54.

The anode-side gas diffusion layer 52 is subjected to the processing for suppressing the protrusion of carbon fibers. On the other hand, the cathode-side gas diffusion layer 54 is not subjected to the processing for suppressing the protrusion of carbon fibers. In the drawings, a "protrusion suppressing layer" refers to a layer having been subjected to the processing for suppressing the protrusion of carbon fibers, and a "protrusion non-suppressing layer" refers to a layer that is not yet subjected to the processing for suppressing the protrusion of carbon fibers.

In the cathode-side gas diffusion layer 54, drainage of generated water is secured because the cathode-side gas diffusion layer 54 is not subjected, to the processing for suppressing the protrusion of carbon fibers, although the protrusion of carbon fibers may occur in the cathode-side gas diffusion, layer 54. On the other hand, protrusion of carbon fibers from the anode-side gas diffusion layer 52 is suppressed in such a way as to prevent a protruded carbon fiber from piercing through the membrane electrode assembly 50.

Figure 2:
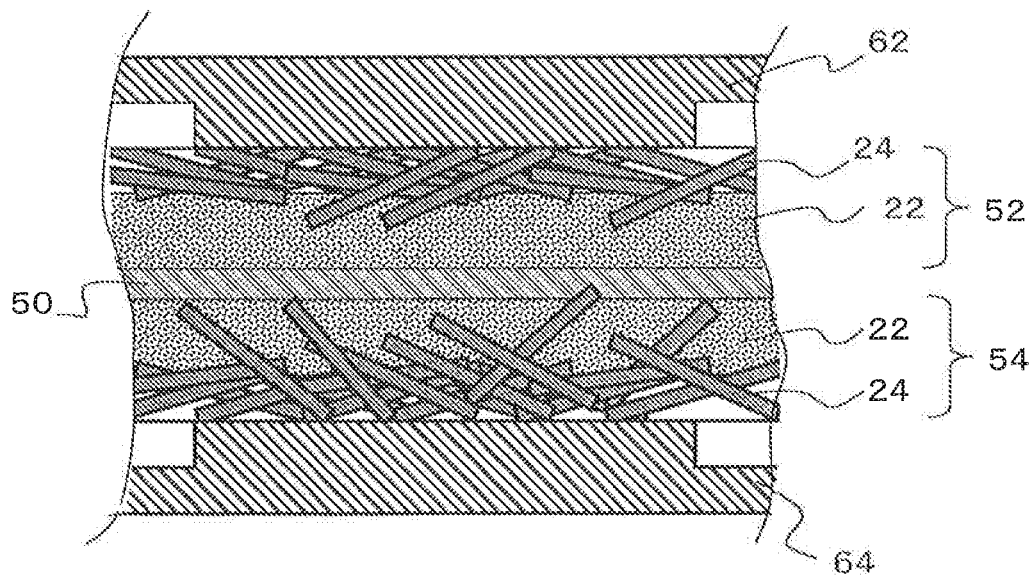
FIG. 2 illustrates a fuel cell configuration according to the first embodiment.

FIG. 2 illustrates a cross-sectional configuration of the fuel cell unit according to the present embodiment. Each of the anode-side gas diffusion layer 52 and the cathode-side gas diffusion layer 54 is constituted by a layer of the carbon fibers 24 and the water repellent layer 22, which are united together with a binder resin. The layer of the carbon fibers 24 is an assembly of carbon fibers, which is, for example, made of a carbonaceous porous material (e.g., carbon paper or carbon cloth). The carbon fibers are made of acrylic resin, polyacrylonitrile (PAN) carbon fibers formed by carbonizing the pitch being spun after heating and fusing processing in a nigh-temperature environment, or the like. Further, the water repellent layer 22 is made of a fluorinepolymer, such as polytetrafluoroethylene (PTFB) or tetrafluoroethylene/hexafluoropropylene copolymer (FEP), and a carbon black.

Figure 11:
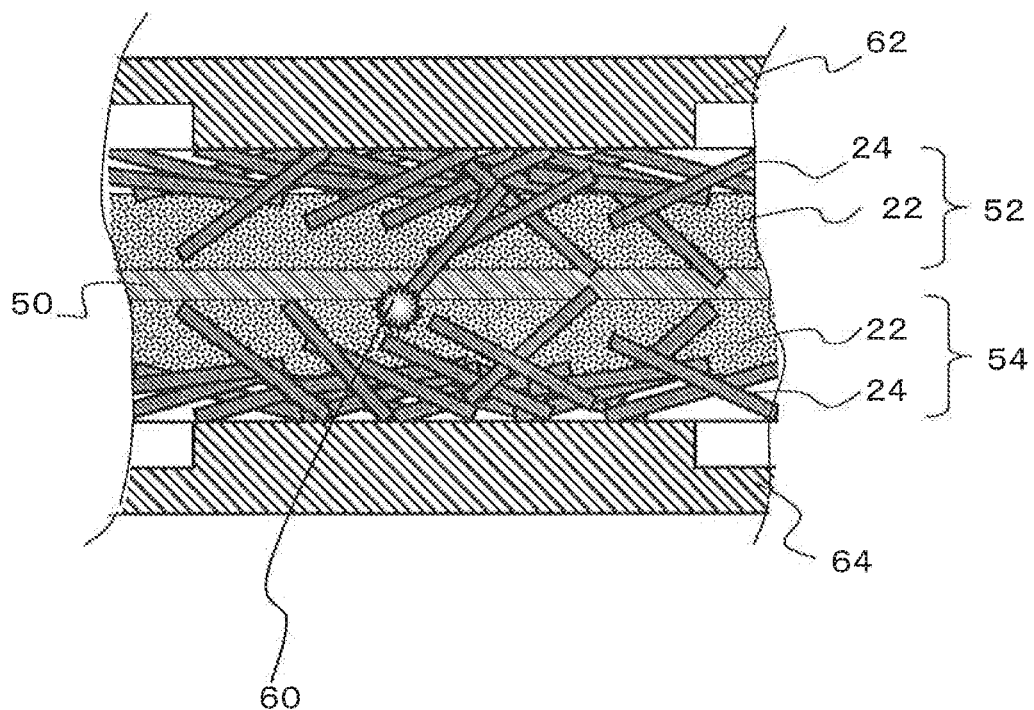
FIG. 11 illustrates a conventional fuel cell configuration.

The cathode-side gas diffusion layer 54 is not subjected to the processing for suppressing the protrusion of carbon fibers. Therefore, there is the possibility of causing the protrusion of carbon fibers. In the drawings, the protrusion of some carbon fibers is schematically illustrated. On the other hand, the anode-side gas diffusion layer 52 is subjected to the processing for suppressing the protrusion of carbon fibers. Therefore, protrusion of carbon fibers from the anode-side gas diffusion layer 52 is sufficiently suppressed. In the drawings, the protrusion of carbon fibers is not recognized in almost the entire region of the anode-side gas diffusion layer 52. It should be noted that the carbon fibers 24 in the anode-side gas diffusion layer 52 illustrated in FIG. 2 differ from the carbon fibers 24 in the anode-side gas diffusion layer 52 illustrated in FIG. 11.

As described above, the processing for suppressing the protrusion of carbon fibers is selectively applied to the anode-side gas diffusion layer 52. Therefore, even when the protrusion of carbon fibers occurs in the cathode-side gas diffusion layer 54, the fuel cell unit can generate a higher output without causing any damage that may be induced when a protruded carbon fiber pierces through the membrane electrode assembly 50.

Next, the carbon fiber protrusion suppression processing will be described in detail.

The anode-side gas diffusion layer 52 is constituted by the carbon fibers 24 and the water repellent layer 22, which are united together with the binder resin. Therefore, it is feasible to suppress protrusion of the carbon fibers 24 by increasing the binder resin content in such a way as to firmly unite the carbon fibers 24. More specifically, as described above, in a case where the fuel cell, includes a plurality of cells laminated together in such a way as to form a stack structure, a significant pressure is applied to the gas diffusion layers 52 and 54 in the thickness direction. Accordingly, a protruded part, of the carbon fibers 24 protrudes from the water repellent layer 22. However, when the binder resin content is high enough to firmly unite the carbon fibers 24 with the water repellent layer 22, it is effectively feasible to prevent the carbon fibers 24 from separating from, the water repellent layer 22 and protruding from the surface of the gas diffusion layer.

Figure 3:
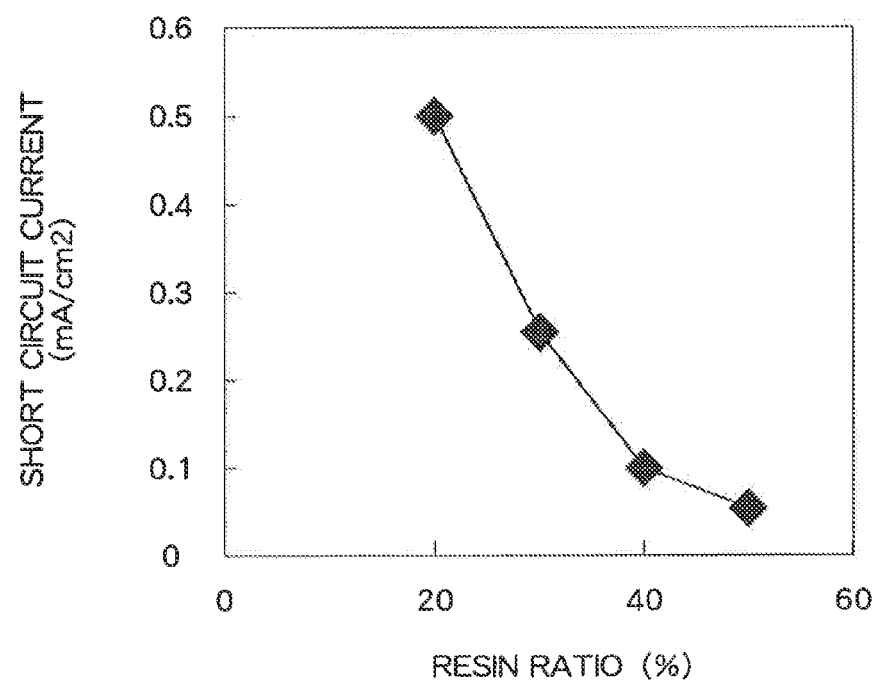
FIG. 3 is a graph illustrating a relationship between binder resin ratio and short circuit current.

FIG. 3 illustrates a relationship between binder resin content and short circuit current in the gas diffusion layers 52 and 54. in FIG. 3, the abscissa axis refers to the resin content (%) and the ordinate axis refers to the short circuit current (mA/cm$^2$) in a state where a predetermined voltage is applied to the gas diffusion layers 52 and 54 while a constant load, is applied to the gas diffusion layers 52 and 54. If a through hole is formed in the membrane electrode assembly 50 by the protrusion of carbon fibers from the gas diffusion layers 52 and 54, the anode electrode and the cathode electrode are brought into a short circuit state and short circuit current flows. When the through hole becomes larger, the short circuit current value increases correspondingly. Accordingly, when the snort circuit current value is large, it means that the through hole is large and the protrusion of carbon fibers is large. On the other hand, when the snort circuit current value is small, it means that the protrusion of carbon fibers is small or suppressed. The short circuit current value is variable depending on the applied voltage or materials of the membrane electrode assembly 50 and the gas diffusion layers 52 and 54. Therefore, the short circuit current value is compared with a predetermined threshold value in a state where the above-described values are maintained at constant values. If the short circuit current value exceeds the threshold value, it can be determined that the protrusion is not suppressed and a through hole is formed in the membrane electrode assembly 50. If the short circuit current value is equal to or less than the threshold value, it can be determined that the protrusion is suppressed and no through hole is formed in the membrane electrode assembly 50. According to the graph illustrated in FIG. 3, it can be determined that no through hole is formed if the short circuit current value is equal to or less than 0.1 mA/cm$^2$ and a through hole is formed if the short circuit current value exceeds 0.1 mA/cm$^2$.

In FIG. 3, the short circuit current value decreases when the resin ratio successively increases from 20% to 30%, 40%, and 50%. Accordingly, it is understood that increasing the binder resin content is effective in suppressing the protrusion of carbon fibers.

Figure 4:
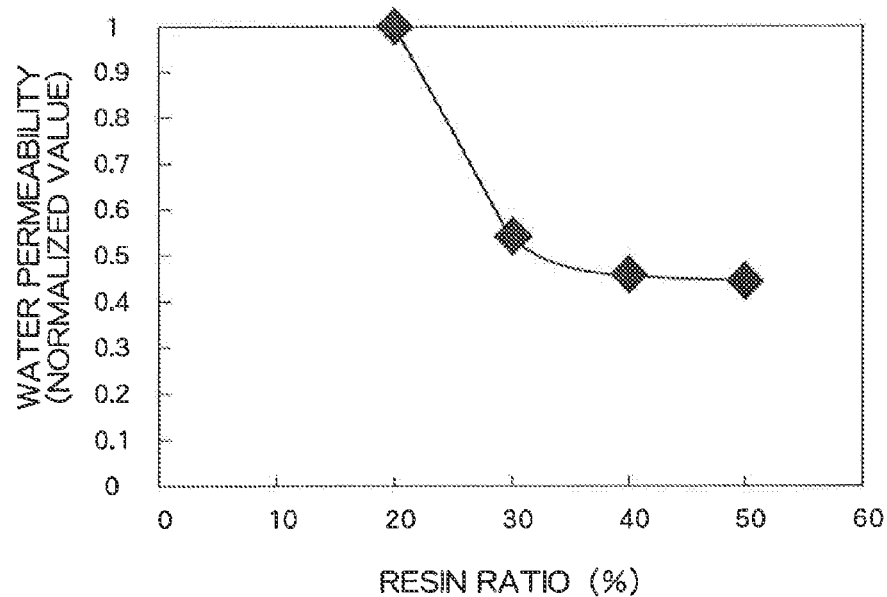
FIG. 4 is a graph illustrating a relationship between binder resin ratio and water permeability.

On the other hand, when the binder resin ratio increases, the drainage deteriorates in the gas diffusion layers 52 and 54 although the protrusion of carbon fibers can be suppressed, FIG. 4 illustrates a relationship between binder resin content and water permeability in the gas diffusion layers 52 and 54. In FIG. 4, the abscissa axis refers to the resin content (%) and the ordinate axis refers to relative water permeability (normalized value) when the water permeability value of the gas diffusion layer is a reference value 1 in a state where the resin content is 20%. When water permeability of the gas diffusion layers 55 and 54 is high, the capability of draining the generated water to the outside is high.

In FIG. 4, the water permeability decreases when the resin ratio successively increases from 20% to 30%, 40%, and 50%. Accordingly, it is understood that increasing the binder resin content reduces or deteriorates the drainage capacity.

From the foregoing, the fuel cell illustrated in FIG. 1 or FIG. 2 can be obtained, by increasing the binder resin content, e.g., from 20% to 50%, in the anode-side gas diffusion layer 52, to prevent the protrusion of carbon, fibers from damaging the membrane electrode assembly 50, while maintaining the binder resin content, e.g., at 20%, in the cathode-side gas diffusion layer 54 to expedite the drainage of generated water.

Further, instead of increasing the binder resin content, applying a constant pressure to the gas diffusion layers 52 and 54 in the thickness direction in a normal temperature environment is useful to suppress the protrusion of carbon fibers. More specifically, in a state where the protrusion of carbon fibers occurs in the gas diffusion layers 52 and 54, the constant pressure is applied in thickness direction to bend the protruded carbon fibers so that they "lie" along the surface of the layer. The above-mentioned, method for applying a constant pressure in a normal temperature environment is referred to as a cold press (CP) method, in comparison with a method for applying a pressure in a high-temperature environment.

Figure 5:
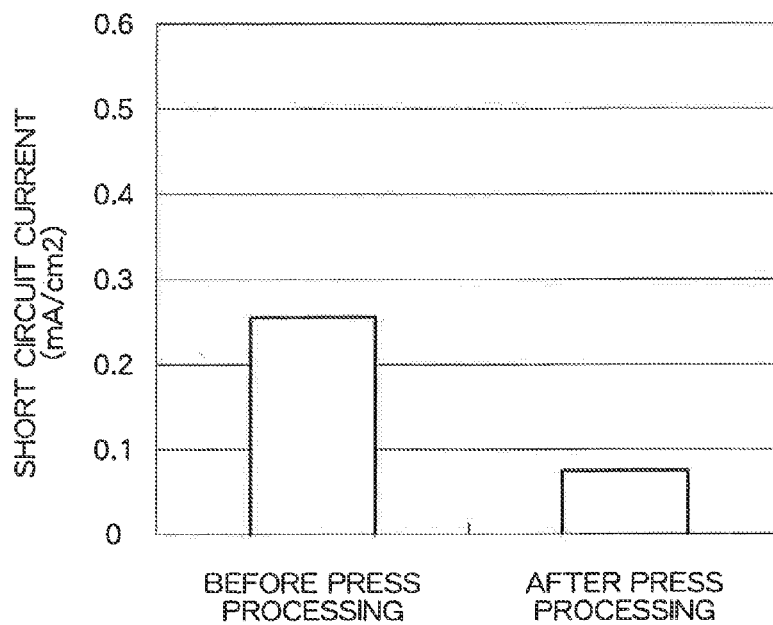
FIG. 5 is a graph illustrating a relationship between cold press and short circuit current.

FIG. 5 illustrates short circuit current values before and after the constant pressure is applied to the gas diffusion layers 52 and 54 according to the cold press method. The short circuit current value before the cola press is 0.25 mA/cm$^2$. The short circuit current value after the cold press is equal to or less than 0.1 mA/cm$^2$ (i.e., less than a half of 0.25 mA/cm$^2$). Accordingly, it is understood that the cola press method is effective to suppress she protrusion of carbon fibers.

Figure 6:
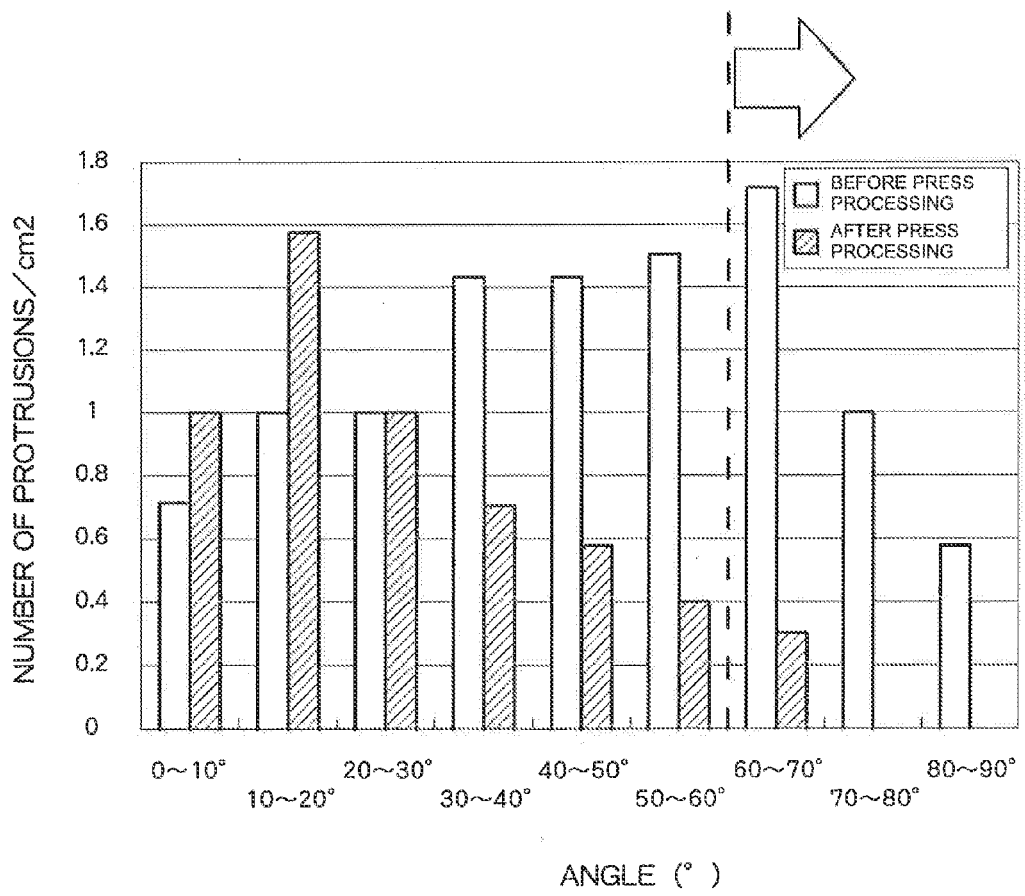
FIG. 6 is a graph illustrating a relationship between fluff angle and the number of fluffs in cold press.

FIG. 6 illustrates an example of a relationship between angle and the number of protrusions with respect to the protrusion of carbon fibers before and after the cold press. In FIG. 6, the abscissa axis refers to the angle (elevation angle) of a carbon fiber protruded, from the layer surface, which is shown in 10° intervals. Further, the ordinate axis refers to number of protrusions (/1 cm$^2$) that are present in a corresponding angular range. Further, in FIG. 6, a left bar in each angular range indicates the number of protrusions before the cold press and a right tar indicates the number of protrusions after the cold press. Before the cold press, protrusions are widely present in a range from 30° to 80°C. In particular, many protrusions are present in a range from 60° to 90°. To the contrary, after the cold press, the number of protrusions in a range from 30° to 70° greatly decreases, and there is not any protrusion in a range from 70° to 90°.

When the protrusion of carbon fibers increases and approaches 90° in angle, there is a higher possibility of piercing through the membrane electrode assembly 50. The applicant of the present invention has found that there is a higher possibility of piercing the membrane electrode assembly 50 and damaging the membrane electrode assembly 50 if the protrusion angle is equal to or greater than 60°, based on various experimental results. The cold press method can greatly reduce the number of protrusions when the angle is equal to or greater than 60°.Therefore, from the foregoing, the cold press method can effectively suppress the protrusion of carbon fibers, in particular in the protrusion angle range of 60° or more, in which there is a higher possibility of damaging the membrane electrode assembly 50.

Although the cold press method is useful to suppress the protrusion of carbon fibers, the drainage in the gas diffusion layer decreases oppositely in the same manner as in the case of increasing the binder resin content. Accordingly, when the cold press method is employed, it is useful to apply the cold press to the anode-side gas diffusion layer 52 and apply no cold press to the cathode-side gas diffusion layer 54, as illustrated in FIG. 1.

Further, other than the above-described methods that are characterized in increasing the binder resin content or using the cold press to bend carbon fibers, there are many methods available to suppress the protrusion of carbon fibers. For example, an available method includes a process of applying a constant load to the gas diffusion layers 52 and 54 to bend the protrusions on the surface and a process of removing the bent protrusions with a cleaner after removing the constant load. Another available method includes a process of applying a constant load to the gas diffusion layers 52 and 54 with a mesh-like member and a process of cutting the protrusions protruding from the mesh with a cutter. Another available method includes a process of sandwiching the gas diffusion layers 52 and 54 with a pair of electrodes and a pressing apparatus and a process of burning off the protrusions by applying a voltage in a pressed state. Another available method includes a process of applying a constant load to the gas diffusion layers 52 and 54 with a mesh-like member and a process of removing the protrusions protruding from the mesh as $CO_2$ through a chemical reaction using oxygen plasma generated in the gas diffusion layer at a side opposed to the mesh. Any one of the above-described methods is employable for the anode-side gas diffusion layer 52 illustrated in FIG. 1.

3. Second Embodiment

According to the manufacturing of a fuel cell unit described in the first embodiment; the anode-side gas diffusion layer 52 is subjected to the processing for suppressing the protrusion of carbon fibers, while the cathode-side gas diffusion layer 54 is not subjected to the processing for suppressing the protrusion of carbon fibers. However, a carbon fiber protruded from the cathode-side gas diffusion layer 54 may happen to pierce through the membrane electrode assembly 50 because the cathode-side gas diffusion layer 54 is not subjected to the carbon fiber protrusion suppression processing.

Hence, in the present embodiment, supplementary processing is added to reduce adverse influence that may be given to the membrane electrode assembly 50 by the protrusion of carbon fibers from the cathode-side gas diffusion layer 54.

Figure 7:
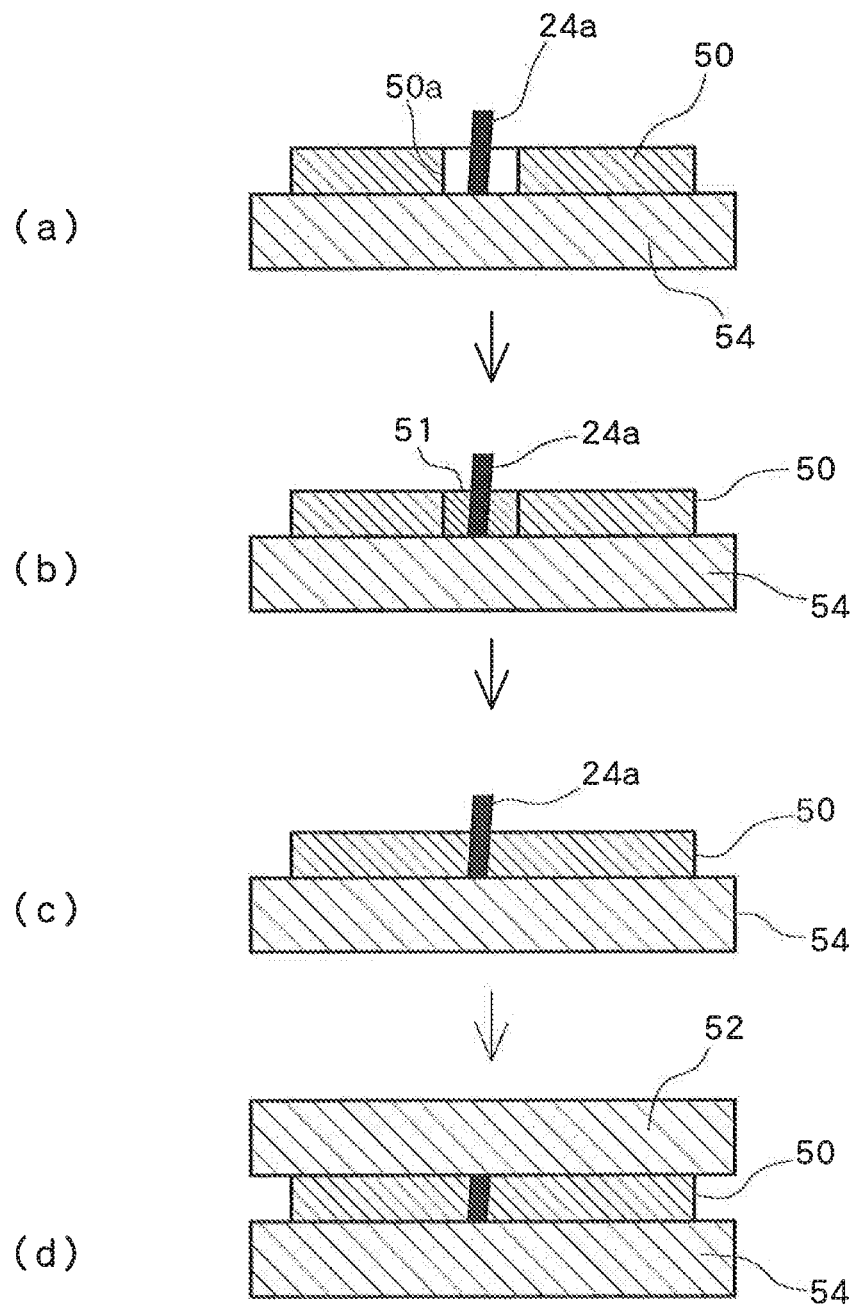
FIG. 7 illustrates a fuel cell manufacturing method according to a second embodiment.

FIG. 7 schematically illustrates a method for manufacturing a fuel cell unit according to the present embodiment, FIGS. 7(a) to 7(d) illustrate sequential steps to be performed in this order in the manufacturing of a fuel cell unit. First, as illustrated in FIG. 7(a), the manufacturing method, includes a process of uniting the membrane electrode assembly 50 with the cathode-side gas diffusion layer 54, which have been manufactured independently, by hot pressing. In this case, the cathode-side gas diffusion layer 54 creeps under a given pressing force, and a carbon fiber protrusion 24a generated in this process leaves a through hole 50a in the membrane electrode assembly 50.

In such a case, as illustrated in FIG. 7(b), the manufacturing method, includes a process of selectively filling up the through hole 50a with a material component 51, which is identical to the electrolyte film, of the membrane electrode assembly 50, using a blade or the like. In this process, the electrolyte film component 51 is kept in a gel state at a temperature not lower than its melting point.

Next, as illustrated in FIG. 7(c), the manufacturing method includes a process of cooling and solidifying the electrolyte component 51 buried, in the through hole 50a to stop up the through hole 50a.

Finally, the manufacturing method includes a process of applying the carbon fiber protrusion suppression processing to the anode-side diffusion layer 52, and then uniting the processed anode-side diffusion layer 52 with the membrane electrode assembly 50 by hot pressing. Although the carbon fiber protrusion 24a of the cathode-side gas diffusion layer 54 is present in the membrane electrode assembly 50, the through hole is filled up with the electrolyte film component 51 and therefore the gas cross leakage and the short circuit can be suppressed.

According to the above-described, first embodiment, the manufacturing- of the fuel cell unit directly proceeds from the process illustrated in FIG. 7(a) to the process illustrated in FIG. 7(d), while skipping the processes illustrated, in FIGS. 7(b) and 7(c). It should be noted that the above-described processing for filling the through hole with, the electrolyte film component 51 is not a prerequisite process and is an optional process that can be performed if it is necessary.

4. Third Embodiment

According to the first embodiment, the anode-side gas diffusion layer 52 is subjected to the carbon fiber protrusion suppression processing, while the cathode-side gas diffusion layer 54 is not subjected to the carbon fiber protrusion suppression processing. Alternatively, it is useful to similarly perform the carbon fiber protrusion, suppression processing for the cathode-side gas diffusion layer 54, if the degree of the processing is sufficiently lower compared to the anode side, for the purpose of expediting the drainage.

FIG. 3 is a cross-sectional view illustrating a fuel cell unit according to the present embodiment. The fuel cell unit illustrated in FIG. 8 includes a membrane electrode assembly (MEA) 50 that is formed by sandwiching an electrolyte film with a pair of catalyst layers each being functionally operable as an electrode. The fuel cell unit further includes two gas diffusionlayers 52 and 54, which are provided on opposite surfaces of the membrane electrode assembly. Each of the gas diffusion layers 52 and 54 includes a layer of carbon fibers 24 and a water repellent layer 22, which are laminated together. Further, the fuel cell unit includes two separators 62 and 64 that are disposed and formed in such a way as to sandwich the membrane electrode assembly 50 and the gas diffusion layers 52 and 54.

The anode-side gas diffusion layer 52 is subjected to processing for relatively highly suppressing the protrusion of carbon fibers. On the other hand, the cathode-side gas diffusion layer 54 is subjected to processing for relatively weakly suppressing the protrusion of carbon fibers compared to the anode-side gas diffusion layer.

The carbon fiber protrusion suppression processing to be applied to the cathode-side gas diffusion layer 54 is relatively weak. Therefore, it is feasible to secure the drainage of generated water while suppressing the protrusion of carbon fibers to a certain extent. On the other hand, the protrusion of carbon fibers is sufficiently suppressed, in the anode-side gas diffusion layer 52. Therefore, it is feasible to prevent the protrusion of carbon fibers from piercing through the membrane electrode assembly 50.

To change the degree of the carbon fiber protrusion suppression processing, it is useful to change a condition for the carbon fiber protrusion suppression processing. For example, when the binder resin, content is increased in suppressing the protrusion, it is useful to set the increasing amount of the binder resin content in the cathode-side gas diffusion layer 54 to be lower than the increasing amount in the anode-side gas diffusion layer 52. For example, the binder resin content in the anode-side gas diffusion layer 52 is set to 40%, while the binder resin content in the cathode-side gas diffusion layer 54 is set to 30%. Further, when the cold press method is employed to suppress the protrusion, a pressure applied to the cathode-side gas diffusion layer 54 in the cold press is set to be lower than that applied to the anode-side gas diffusion layer 52. Alternatively, the pressing time for the cathode-side gas diffusion layer 54 is set to be shorter than the anode-side gas diffusion layer 52.

Figure 9:
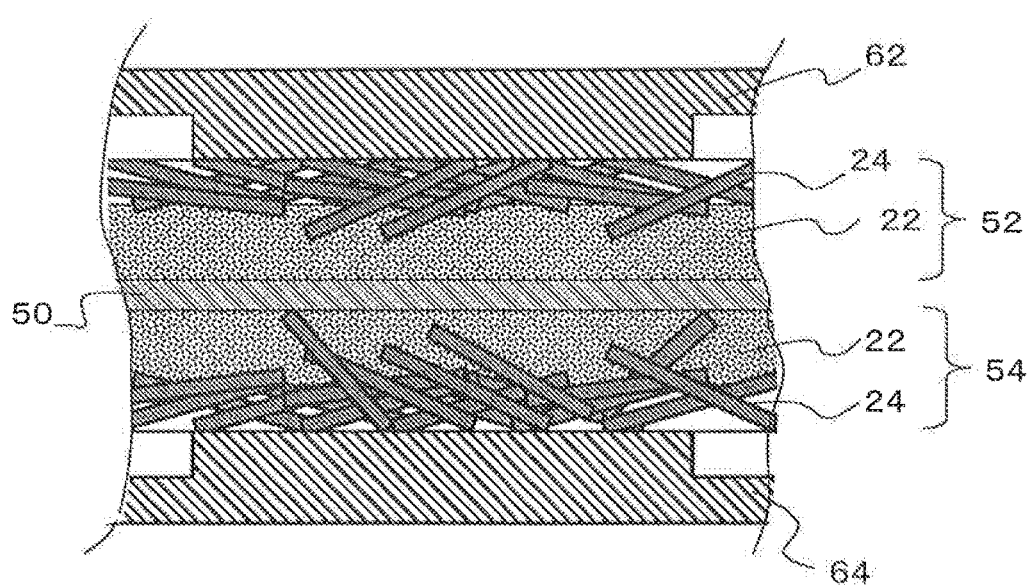
FIG. 9 illustrates a fuel cell configuration according to the third embodiment.

FIG. 9 illustrates a cross-sectional configuration of the fuel cell unit according to the present, embodiment. Each of the anode-side gas diffusion layer 52 and the cathode-side gas diffusion layer 54 includes a layer of carbon fibers 24 and a water repellent layer 22 that are united together with a binder resin.

The degree of the carbon fiber protrusion suppression processing applied to the cathode-side gas diffusion layer 54 is relatively low. Therefore, the protrusion of carbon fibers can be suppressed to a certain extent. As schematically illustrated in FIG. 9, the protrusion of carbon fibers that may occur is very small in size or amount. On the other hand, the degree of the carbon fiber protrusion suppression processing applied to the anode-side gas diffusion layer 52 is relatively high. Therefore, the protrusion of carbon fibers can be sufficiently suppressed. As illustrated in FIG. 9, there is not any carbon fiber that protrudes from the anode-side gas diffusion layer 52. It should be noted that the carbon fibers 24 in the anode-side gas diffusion layer 52 and the cathode-side gas diffusion layer 54 illustrated in FIG. 9 differ from the carbon fibers 24 in the anode-side gas diffusion layer 52 and the cathode-side gas diffusion layer 54 illustrated in FIG. 11, As described above, the membrane electrode assembly 50 can be effectively prevented from being damaged by the carbon fibers because the carbon fiber protrusion suppression processing is applied to both the anode-side gas diffusion layer 52 and the cathode-side gas diffusion layer 54. Further, the degree of the carbon fiber protrusion suppression processing to be applied to the cathode-side gas diffusion layer 54 is relatively restricted because of expediting the drainage. Therefore, the drainage of generated water can be secured adequately.

The degree of the protrusion of carbon fibers can be evaluated based on the short circuit current value illustrated in FIG. 3. Accordingly, when the degree of the processing to be applied to the anode-side gas diffusion layer 52 differs from the degree of the processing to be applied to the cathode-side gas diffusion layer, as described above in the present embodiment, it is feasible to evaluate the magnitude in degree based on the snort circuit current value in a state where the same voltage is applied. In the present embodiment, a relationship "anode-side gas diffusion layer 52>cathode-side gas diffusion layer 54" is satisfied with respect to the degree of the processing. Therefore, a relationship "short circuit current value of anode-side gas diffusion layer 52<short circuit current value of cathode-side gas diffusion layer 54" can be satisfied with respect to the short circuit current value. In the present embodiment, the "short circuit current value of anode-side gas diffusion layer 52" indicates the short circuit current that flows when sandwiching the membrane electrode assembly 50 with two anode-side gas diffusion layers 52 is employed as a fuel cell configuration. Similarly, the "short circuit current value of cathode-side gas diffusion layer 54" indicates the short circuit current that flows when sandwiching the membrane electrode assembly 50 with two cathode-side gas diffusion layers 54 is employed as a fuel cell configuration.

Further, it is necessary for the protrusion of carbon fibers from the anode-side gas diffusion, layer 52 to be sufficiently suppressed. This means that the short circuit current value of the anode-side gas diffusion layer 52 is equal to or less than the predetermined threshold value. It is needless to say that the short circuit current value of the cathode-side gas diffusion layer 54 can be equal to or less than the predetermined threshold value, as long as the above-described magnitude correlation can be maintained.

5. Fourth Embodiment

In the third embodiment, the degree of the carbon fiber protrusion suppression processing to be applied to the anode-side gas diffusion layer 52 is different from the degree of the carbon fiber protrusion suppression processing to be applied to the cathode-side gas diffusion layer 54, although the processing type is the same. In the present embodiment, a carbon fiber protrusion suppression processing method to be applied to the anode-side gas diffusion layer 52 is different from a carbon fiber protrusion suppression processing method to be applied to the cathode-side gas diffusion layer 54.

Figure 10:
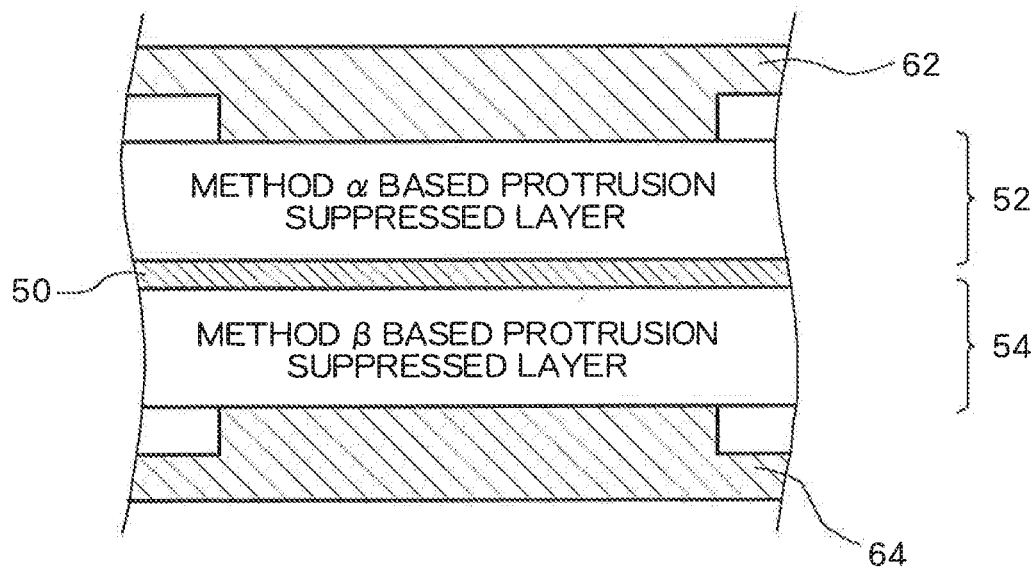
FIG. 10 illustrates a fuel cell according to a fourth embodiment.

FIG. 10 is a cross-sectional view illustrating a fuel cell unit according to the present embodiment. The fuel cell unit illustrated in FIG. 10 includes a membrane electrode assembly (MEA) 50 that is formed by sandwiching an electrolyte film with a pair of catalyst layers, each being functionally operable as an electrode. The fuel cell unit further includes two gas diffusion layers 52 and 54, which are provided on opposite surfaces of the membrane electrode assembly. Each of the gas diffusion layers 52 and 54 includes a layer of carbon fibers 24 and a water repellent layer 22, which are laminated together. Further, the fuel cell unit includes two separators 62 and 64 that are disposed and formed in such a way as to sandwich the membrane electrode assembly 50 and the gas diffusion, layers 52 and 54.

The anode-side gas diffusion layer 52 is subjected to carbon fiber protrusion suppression processing to be performed according to a method α. On the other hand, the cathode-side gas diffusion, layer 54 is subjected to carbon fiber protrusion suppression processing to be performed according to a method β that is different from the method α. In the present embodiment, the method α is a method, that sets the effect of suppressing the protrusion of carbon fibers to be higher, compared to the method β. In other words, the method β is a method that is relatively effective to suppress reduction (or deterioration) in the drainage, compared to the method α. The method a can be any one of the above-described carbon fiber protrusion suppression processing methods and the method β can be another one of the above-described carbon fiber protrusion suppression processing methods. For example, when a method that increases the binder resin content from 20% to 30% is compared with the cold press method, if it is presumed that the method that sets the binder resin content to 30% is highly effective in suppressing the protrusion of carbon fibers but is undesirable in that the drainage capacity deteriorates correspondingly, the method that increases the binder resin content is employable as the method a and the cold press method is employable as the method β. It is needless to say that the above-described methods are mere examples. The person skilled in the art can experimentally determine suppression effects and drainage reduction effects according to various methods that can suppress the protrusion of carbon fibers and can select the method α and the method β based on experimental result.

Among various methods that can suppress the protrusion of carbon fibers, if a method is highly effective in suppressing the protrusion and is extremely inferior in suppressing reduction in drainage and another method is somewhat effective in suppressing the protrusion and does not deteriorate the drainage so much, the former method is employable as the method a and the latter method is employable as the method β. In short, the method a gives priority to the effect of suppressing the protrusion of carbon fiber and the method β gives priority to the effect of maintaining the drainage.

The protrusion of carbon fibers from the anode-side gas diffusion layer 52 can be suppressed according to the method α, and the cathode-side gas diffusion layer 54 not only has suppressed protrusion of carbon fibers but also has secured drainage of generated water according to the method β. Therefore, it is feasible to prevent the membrane electrode assembly 50 from being damaged and realize a fuel cell unit that can generate a higher output.

6. Modified Embodiment

The present invention is not limited to the above-described embodiments and various modified embodiments are also employable.

For example, the following methods that, can suppress the protrusion of carbon fibers are arbitrarily combinable.

(1) increasing the binder resin content
(2) cold press method
(3) applying a load to the gas diffusion layer to bend the protrusions and removing the bent protrusions with a cleaner
(4) cutting the protrusions overhanging from a mesh with a cutter
(5) burning off the protrusions by applying a voltage while pressing the gas diffusion layer
(6) oxygen plasma processing For example, combining the method (1) and (2) is useful to increase the binder resin content and perform the cold press. Combining the method (2) and (5) is useful to burn off the protrusions by applying a voltage after performing the cold press.

Figure 8:
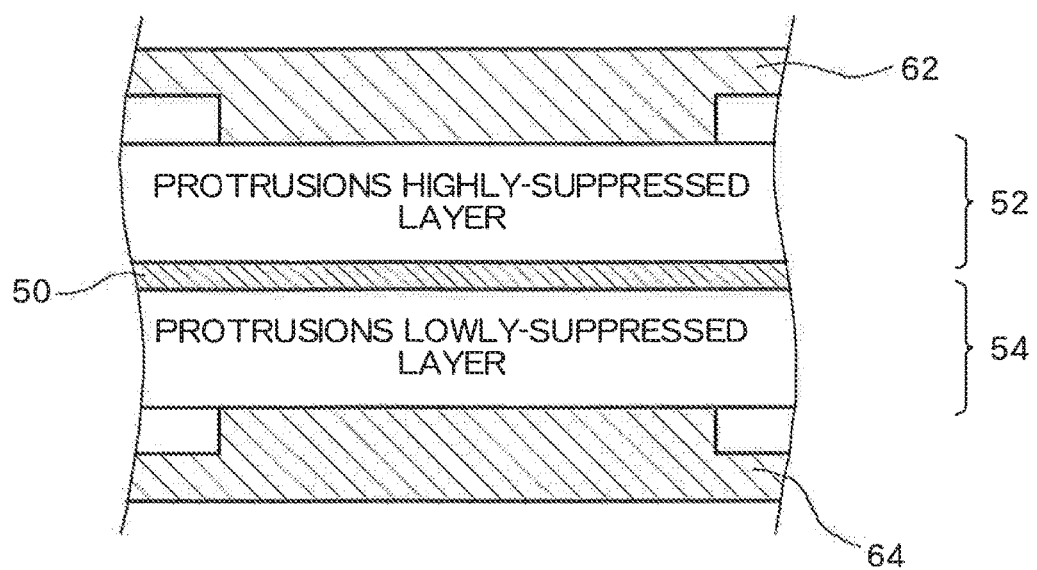
FIG. 8 illustrates a fuel cell according to a third embodiment.

Further, the configuration illustrated in FIG. 8 can be combined with the configuration illustrated in FIG. 10. More specifically, the carbon fiber protrusion suppression processing method to be applied to the anode-side gas diffusion layer 52 is differentiated from the method applied to the cathode-side gas diffusion layer 54. The predetermined degree for the cathode-side gas diffusion layer 54 is set to be relatively low.

Further, in the present embodiment, the drainage of generated water is taken into consideration in selecting the carbon fiber protrusion suppression processing for the cathode-side gas diffusion layer 54. However, not only the drainage of generated water but also the gas diffusibility can be taken into consideration in selecting the processing. More specifically, if air that serves as the oxidizing agent gas is supplied to the cathode-side gas diffusion layer 54, gas diffusion performance of the cathode-side gas diffusion layer 54 is required to be higher than that of the anode-side gas diffusion layer to efficiently diffuse the oxygen that reacts with the hydrogen ion supplied from the anode side. Accordingly, as the processing to be applied to the cathode-side gas diffusion layer 54, it is useful to select, processing that is relatively high not only in terms of drainage but also in the gas diffusion performance compared to the anode-side gas diffusion layer 52.

Further, the fuel cell unit according to the present embodiment can be preferably applied to a vehicle because the fuel cell unit is functionally operable as a power source that supplies electric power to a drive motor of the vehicle. However, the application of the fuel cell unit according to the present embodiment is not limited to the vehicle.

Description of the reference numerals 22 water repellent layer, 24 carbon fibers, 50 membrane electrode assembly, 52 anode-side gas diffusion layer, 54 cathode-side gas diffusion layer, 62, 64 separators.

The invention claimed is:

1. A fuel cell comprising:
   a membrane electrode assembly including catalyst layers provided on both surfaces of an electrolyte film;
   an anode-side gas diffusion layer provided on an anode side of the membrane electrode assembly; and
   a cathode-side gas diffusion layer provided on a cathode side of the membrane electrode assembly,
   wherein the anode-side gas diffusion layer and the cathode-side gas diffusion layer include carbon fibers,
   a degree of protrusion of the carbon fibers from a plane surface of the anode-side gas diffusion layer and a degree of protrusion of the carbon fibers from a plane surface of the cathode-side gas diffusion layer are mutually different, and the protrusion, of carbon fibers from the plane surface of the anode-side gas diffusion layer is relatively suppressed compared to the cathode-side gas diffusion layer.

2. The fuel cell according to claim 1, wherein protrusion of carbon fibers from the the anode-side gas diffusion layer is suppressed and the protrusion of carbon fibers from the cathode-side gas diffusion layer is not suppressed.

3. The fuel cell according to claim 1, wherein the protrusion of carbon fibers from the anode-side gas diffusion layer is suppressed using a first method, and the protrusion of carbon fibers from the cathode-side gas diffusion layer is suppressed using a second method that is different from the first method.

4. The fuel cell according to claim 1, wherein a short circuit current value of the anode-side gas diffusion layer is set to be smaller than a short circuit current value of the cathode-side gas diffusion layer.

5. The fuel cell according to claim 4, wherein at least the short circuit current value of the anode-side gas diffusion layer is equal to or less than a predetermined threshold value.

6. The fuel cell according to claim 1, wherein a binder resin content of the anode-side gas diffusion layer is set to be greater than a binder resin content of the cathode-side gas diffusion layer.

* * * * *